(12) United States Patent
Yuasa et al.

(10) Patent No.: US 7,761,230 B2
(45) Date of Patent: Jul. 20, 2010

(54) METHOD AND APPARATUS FOR DISPLAYING A NIGHT-VIEW MAP

(75) Inventors: Mizuki Yuasa, Iwaki (JP); Takeshi Kurosawa, Iwaki (JP)

(73) Assignee: Alpine Electronics Inc., Tokyo (JP)

( * ) Notice: Subject to any disclaimer, the term of this patent is extended or adjusted under 35 U.S.C. 154(b) by 1105 days.

(21) Appl. No.: 11/080,366

(22) Filed: Mar. 14, 2005

(65) Prior Publication Data

US 2005/0228586 A1 Oct. 13, 2005

(30) Foreign Application Priority Data

Mar. 26, 2004 (JP) ............... 2004-093147

(51) Int. Cl.
*G01C 21/32* (2006.01)
*G08G 1/13* (2006.01)
*G01C 21/00* (2006.01)

(52) U.S. Cl. ............... 701/212; 701/207; 701/211; 340/995.14; 340/995.27

(58) Field of Classification Search ............ 340/995.15, 340/995.24, 995.1, 995.27, 995.14, 995.4, 340/995.271; 345/629, 630, 636, 592, 617; 701/200, 207, 211, 212

See application file for complete search history.

(56) References Cited

U.S. PATENT DOCUMENTS

| | | | |
|---|---|---|---|
| 3,857,709 A | 12/1974 | Domeshek | |
| 4,065,309 A | 12/1977 | Domeshek | |
| 5,519,392 A * | 5/1996 | Oder et al. ............ | 340/995.27 |
| 5,757,290 A | 5/1998 | Watanabe et al. | |
| 5,862,498 A | 1/1999 | Koyanagi et al. | |
| 5,862,510 A | 1/1999 | Saga et al. | |
| 5,884,218 A | 3/1999 | Nimura et al. | |
| 5,917,436 A | 6/1999 | Endo et al. | |
| 5,995,106 A | 11/1999 | Naughton et al. | |
| 6,012,014 A | 1/2000 | Koyanagi et al. | |
| 6,035,253 A | 3/2000 | Hayashi et al. | |
| 6,064,322 A | 5/2000 | Ohira | |
| 6,064,941 A | 5/2000 | Nimura et al. | |
| 6,144,920 A * | 11/2000 | Mikame ............ | 701/212 |
| 6,278,383 B1 | 8/2001 | Endo et al. | |

(Continued)

FOREIGN PATENT DOCUMENTS

CN 1696612 A 11/2005

(Continued)

OTHER PUBLICATIONS

Office Action and Notice of References Cited for U.S. Appl. No. 11/126,952, dated Aug. 5, 2008, 08 pages.

(Continued)

*Primary Examiner*—Thomas G Black
*Assistant Examiner*—Christine M Behncke
(74) *Attorney, Agent, or Firm*—Brinks Hofer Gilson & Lione

(57) ABSTRACT

A navigation apparatus including a memory for storing building data of buildings; a display; a decimating unit for decimating the building data based on the unit of the bar scale of a map appearing on the display; and a display controller for displaying the buildings on a map on the display based on the building data decimated by the decimating unit.

12 Claims, 10 Drawing Sheets

U.S. PATENT DOCUMENTS

| | | |
|---|---|---|
| 6,405,129 B1 * | 6/2002 | Yokota ........................ 701/208 |
| 6,421,604 B1 | 7/2002 | Koyanagi et al. |
| 6,493,630 B2 * | 12/2002 | Ruiz et al. .................. 701/208 |
| 6,525,690 B2 | 2/2003 | Rudow et al. |
| 6,603,407 B2 | 8/2003 | Endo et al. |
| 6,621,494 B2 | 9/2003 | Matsuoka et al. |
| 6,756,919 B2 | 6/2004 | Endo et al. |
| 6,801,638 B1 | 10/2004 | Janssen et al. |
| 6,836,728 B2 | 12/2004 | Shimabara |
| 6,904,360 B2 | 6/2005 | Pechatnikov et al. |
| 7,176,924 B2 | 2/2007 | Wilkinson |
| 7,225,077 B2 | 5/2007 | Kouchiyama |
| 2001/0028350 A1 | 10/2001 | Matsuoka et al. |
| 2002/0010544 A1 | 1/2002 | Rudow et al. |
| 2002/0149604 A1 | 10/2002 | Wilkinson |
| 2003/0018427 A1 * | 1/2003 | Yokota et al. ............... 701/208 |
| 2003/0023374 A1 * | 1/2003 | Shimabara .................. 701/212 |
| 2003/0201914 A1 * | 10/2003 | Fujiwara et al. ......... 340/995.24 |
| 2004/0021584 A1 * | 2/2004 | Hartz et al. ............ 340/995.24 |
| 2004/0030493 A1 | 2/2004 | Pechatnikov et al. |
| 2004/0039934 A1 | 2/2004 | Land et al. |
| 2005/0177303 A1 * | 8/2005 | Han .......................... 701/209 |
| 2005/0261826 A1 | 11/2005 | Kurosawa et al. |
| 2006/0022214 A1 | 2/2006 | Morgan et al. |
| 2006/0033738 A1 | 2/2006 | Wilkinson |
| 2006/0129933 A1 | 6/2006 | Land et al. |

FOREIGN PATENT DOCUMENTS

| | | | | |
|---|---|---|---|---|
| JP | 08-063575 | | | 3/1996 |
| JP | 409212512 A | * | | 8/1997 |
| JP | 10-153449 | | | 6/1998 |
| JP | 10-177338 | | | 6/1998 |
| JP | 11-73099 | | | 3/1999 |
| JP | 2000-283784 | | | 10/2000 |
| JP | 02001033257 A | * | | 2/2001 |
| JP | 2001-125702 | | | 5/2001 |
| JP | 2002-267464 | | | 9/2002 |
| JP | 2002-372427 | | | 12/2002 |
| JP | 2003-004463 | | | 1/2003 |
| JP | 2003-114615 | | | 4/2003 |
| JP | 2003/329469 A | | | 11/2003 |
| JP | 2005/326154 A | | | 11/2005 |

OTHER PUBLICATIONS

Office Action and Notice of References Cited for U.S. Appl. No. 11/126,952, dated Sep. 24, 2008, 10 pages.

Office Action and Notice of References Cited for U.S. Appl. No. 11/126,952, dated May 14, 2009, 11 pages.

* cited by examiner

FIG. 5A
| | EMITTING POINTS | |
|---|---|---|
| DECIMATION | EXAMPLE 1 | EXAMPLE 2 |
| LARGE SCALE | ALL POINTS ON PLANE SPECIFIED BY PLANE DATA S | FOUR POINTS AT CORNERS |
| SMALL SCALE | FOUR POINTS AT CORNERS | CENTER POINT ON PLANE |
FIG. 5B
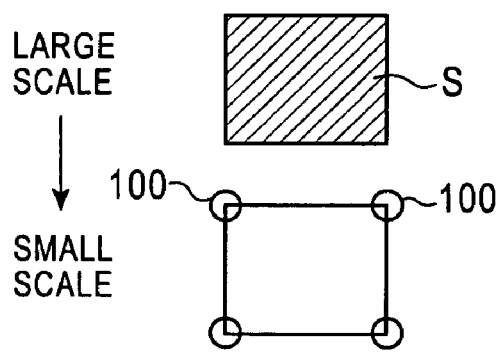
FIG. 5C
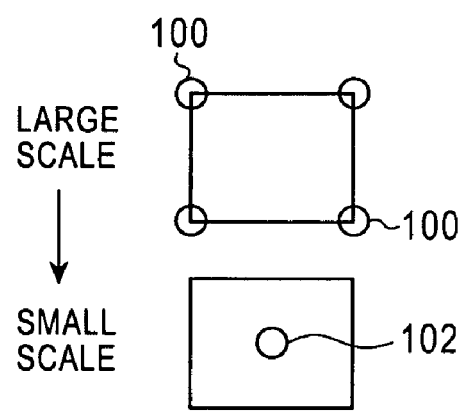

|   |   |   |   |   |   |   |
|---|---|---|---|---|---|---|
| 1 | 2 | 1 | 2 | ... | 2 | 1 |
| 2 | 1 | 2 | 1 |  | 1 | 2 |
| 1 | 2 | 1 |  |  | 2 | 1 |
| 2 | 1 |  |  |  | 1 | 2 |
| 1 | 2 |  |  |  | 2 | 1 |
|   |   |   |   |   |   |   |
| 2 | 1 |   | ... |  | 1 | 2 |
| 1 | 2 | 1 |  |  | 2 | 1 |

METHOD AND APPARATUS FOR DISPLAYING A NIGHT-VIEW MAP

BACKGROUND OF THE INVENTION

1. Field of the Invention

The present invention relates to electronic devices having navigation functions for searching for routes to a destination and displaying a map around a current vehicle position, and in particular, relates to methods for displaying night-view maps.

2. Description of the Related Art

A navigation apparatus detects a current vehicle position, reads out data of a map around the current vehicle position from a map database, draws a map on a display, and superimposes a vehicle mark on the map. When the current vehicle position changes in response to movement of the vehicle, the map scrolls and the vehicle mark moves in response to the movement of the vehicle.

A map to be displayed preferably shows images of, for example, actual roads and intersections, as closely as possible and presents the images to users as guidance information in a plain format. Particularly, in displaying, for example, intersections and towns at a large scale, the map is preferably designed with, for example, a three-dimensional display technique so that users can perceive reality.

At a scale used for displaying a relatively wide area, a map is often flat and feature-less. As disclosed in Japanese Unexamined Patent Application Publication No. 2000-283784, when a scale of 1 to 160,000 or more is used for displaying a wide area, a map is displayed using picture data that is shot from a satellite and stored in advance.

When the scale of a map is small, an area to be displayed is expanded to include a large number of buildings and the like. However, the number of pixels (resolution) in the horizontal and vertical directions on a display, such as a liquid crystal display, is limited. When all buildings and the like are displayed in this situation, they are so close to each other that users cannot clearly recognize them. Thus, no buildings and the like are displayed at a small scale below a predetermined level.

When no buildings and the like are displayed at a small scale, the screen is feature-less, so that users cannot perceive the actual situation and cannot find the screen appealing. When no buildings and the like are displayed in a nighttime display mode that is switched on in response to time or a vehicle light (light switch) being turned on, a large part of the screen may appear black. On the other hand, when picture data is used at a small scale, as disclosed in the foregoing document, high costs are involved in creating, processing, and storing the picture data.

SUMMARY OF THE INVENTION

Accordingly, it is an object of the present invention to provide an electronic device having a navigation function and a method for displaying buildings, in which the buildings can be displayed properly based on the unit of the bar scale of a map appearing on a display, to solve the problems with the related art described above.

It is another object of the present invention to provide an electronic device having a navigation function and a method for displaying buildings, in which a night-view map can be displayed using building data.

An electronic device having a navigation function according to an embodiment the present invention includes a memory for storing building data of buildings; a display; a decimating unit for decimating the building data based on the unit of the bar scale of a map appearing on the display; and a display controller for displaying the buildings on a map on the display based on the building data decimated by the decimating unit.

A method for displaying buildings in an electronic device having a navigation function according to the present invention includes a determining step of determining the unit of the bar scale of a map appearing on a display; a decimating step of decimating building data based on the unit of the bar scale; and a displaying step of displaying the buildings based on the decimated building data.

According to an embodiment of the present invention, building data is decimated based on the unit of the bar scale of a map appearing on a display, so that buildings can be displayed realistically even at a small scale. Moreover, in a nighttime mode, locations of buildings emit light on a night-view map to avoid boredom. Thus, a night-view map that entertains users can be displayed.

Embodiments of the present invention having navigation functions can be used in navigation apparatuses, navigation systems, and electronic apparatuses, for example, computers, having navigation functions. The electronic devices can also be used in multimedia-compatible electronic apparatuses having audio functions, television receiving functions, and the like in addition to navigation functions and used in electronic systems composed of electronic apparatuses having these functions.

BRIEF DESCRIPTION OF THE DRAWINGS

FIGS. 5A, 5B, and 5C illustrate typical decimation processes in the embodiment;

DESCRIPTION OF THE PREFERRED EMBODIMENTS

Embodiments of the present invention are preferably contained in vehicle-mounted navigation apparatuses. The navigation apparatuses will be described in detail with reference to the drawings.

Figure 1:
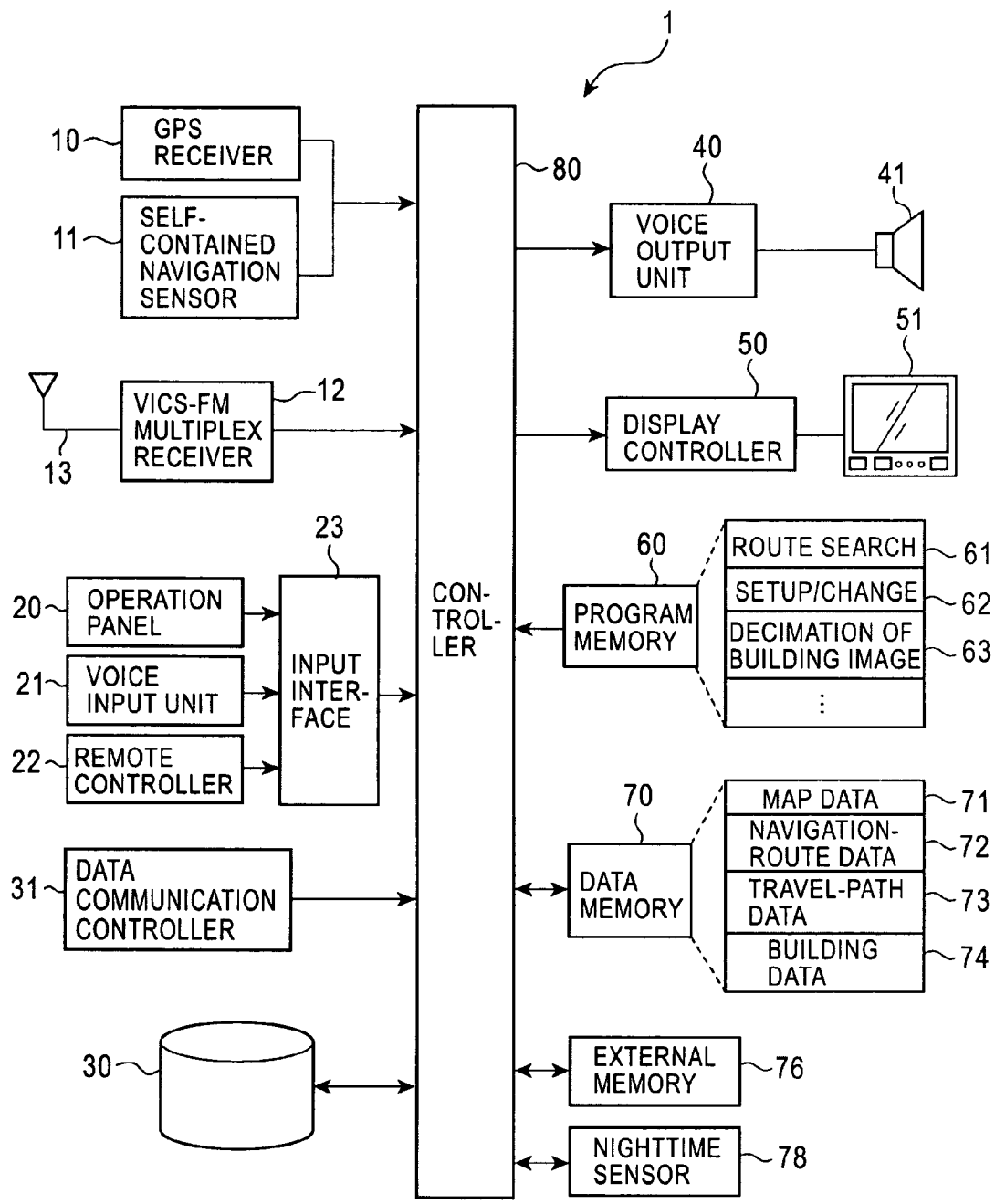
FIG. 1 is a block diagram illustrating the structure of a navigation apparatus according to an embodiment of the present invention.

FIG. 1 is a block diagram illustrating the structure of a navigation apparatus according to an embodiment of the present invention. A global positioning system (GPS) receiver 10 receives electromagnetic waves from a GPS satellite to measure the current position and orientation of a vehicle. A self-contained navigation sensor 11 includes a vehicle speed sensor measuring distance traveled by the vehicle and an angle sensor measuring a rotation angle of the vehicle. Position detection signals are supplied to a controller 80 from both the GPS receiver 10 and the self-contained navigation sensor 11. The controller 80 indicates the current vehicle position on a map based on these position detection signals.

A vehicle information and communication system-frequency modulation (VICS-FM) multiplex receiver 12 continuously receives information of current road traffic around a vehicle through an antenna 13. An input section of a navigation apparatus 1 includes an operation panel 20, a voice input unit 21, and a remote controller 22. The operation panel 20 includes, for example, a touch panel of a display 51. An input interface 23 transmits information input from the operation panel 20, the voice input unit 21, and the remote controller 22 to the controller 80.

A storage unit 30 preferably includes a high-capacity hard disk drive (HDD). The HDD can store data of maps, addresses, telephone numbers, facilities, and the like and can store programs that carry out a variety of navigation functions.

The map data includes, for example, road data and drawing data that are used in drawing facilities, buildings, and the like. The drawing data includes information of, for example, locations, planar shapes, heights, types of polygons and lines, and colors, for displaying images of buildings, roads, signals, and the like in towns so that the images are as similar to actual images as possible. The road data includes information of links and nodes connected to the links. Information of each link includes the location information, the road width, the distance, the road type, and the like of the link. Information of each node includes the location information, the type, the lane information, and the like of an intersection.

Figure 2:
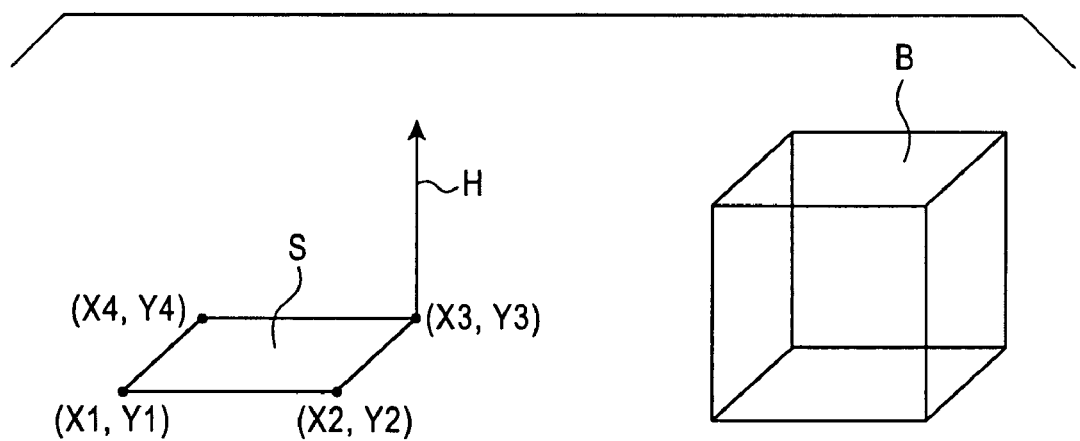
FIG. 2 illustrates building-shape data included in building data.

Data of buildings includes, for example, building-shape data as shown in FIG. 2. Each building-shape data includes two-dimensional plane data S and height data H. The two-dimensional plane data S includes coordinates at corners of a plane: (X1,Y1), (X2,Y2), (X3,Y3), and (X4,Y4). A building B is drawn on a display with reference to the plane data S and the height data H. Here, the plane data S of a rectangular plane is shown as an example. When the building has a triangular-prism shape, the plane data specifies a triangle.

A data communication controller 31 transmits and receives data wirelessly. A voice output unit 40 includes a speaker 41 that outputs a voice under the control of the controller 80. For example, the speaker 41 outputs a voice that alerts a user to the route direction before reaching each intersection on the way to a destination.

A display controller 50 is connected to the display 51. Under the control of the controller 80, the display controller 50 outputs a map to the display 51 based on map data from the storage unit 30 or a data memory 70. The display controller 50 may superimpose the following objects on the output map: a vehicle mark indicating a current vehicle position, a route to a destination, intersection signs, buildings, facilities, landmarks, and the like.

A program memory 60 stores various types of programs executed in a navigation apparatus, and the controller 80 operates based on these programs. Programs may be stored in the program memory 60 in advance, or may be loaded into the program memory 60 from the storage unit 30 at execution time. The program memory 60 stores, for example, a program 61 for searching for routes to a destination; a program 62 for setting up and changing, for example, maps to be displayed on the display 51; and a program 63 for decimating images of buildings and the like according to the map scale.

The data memory 70 stores map data 71 that is derived from various types of calculations by the controller 80 or read out from the storage unit 30, navigation-route data 72 indicating a route to a destination, and travel-path data 73 indicating the actual path of the vehicle. The data memory 70 also stores building data derived from decimating images of buildings and the like, as described above. The data memory 70 may be a dynamic random access memory (DRAM), a static random access memory (SRAM), or a flash memory. In one arrangement, content of the data memory 70 may be transferred to the storage unit 30. An external memory 76 that can be attached to the navigation apparatus 1 may be used in combination with the data memory 70.

A nighttime sensor 78 detects, for example, on-off operation of a light switch of a vehicle, or detects whether it is daytime or nighttime based on time information. The result of the detection by the nighttime sensor 78 is transmitted to the controller 80.

Figure 3:
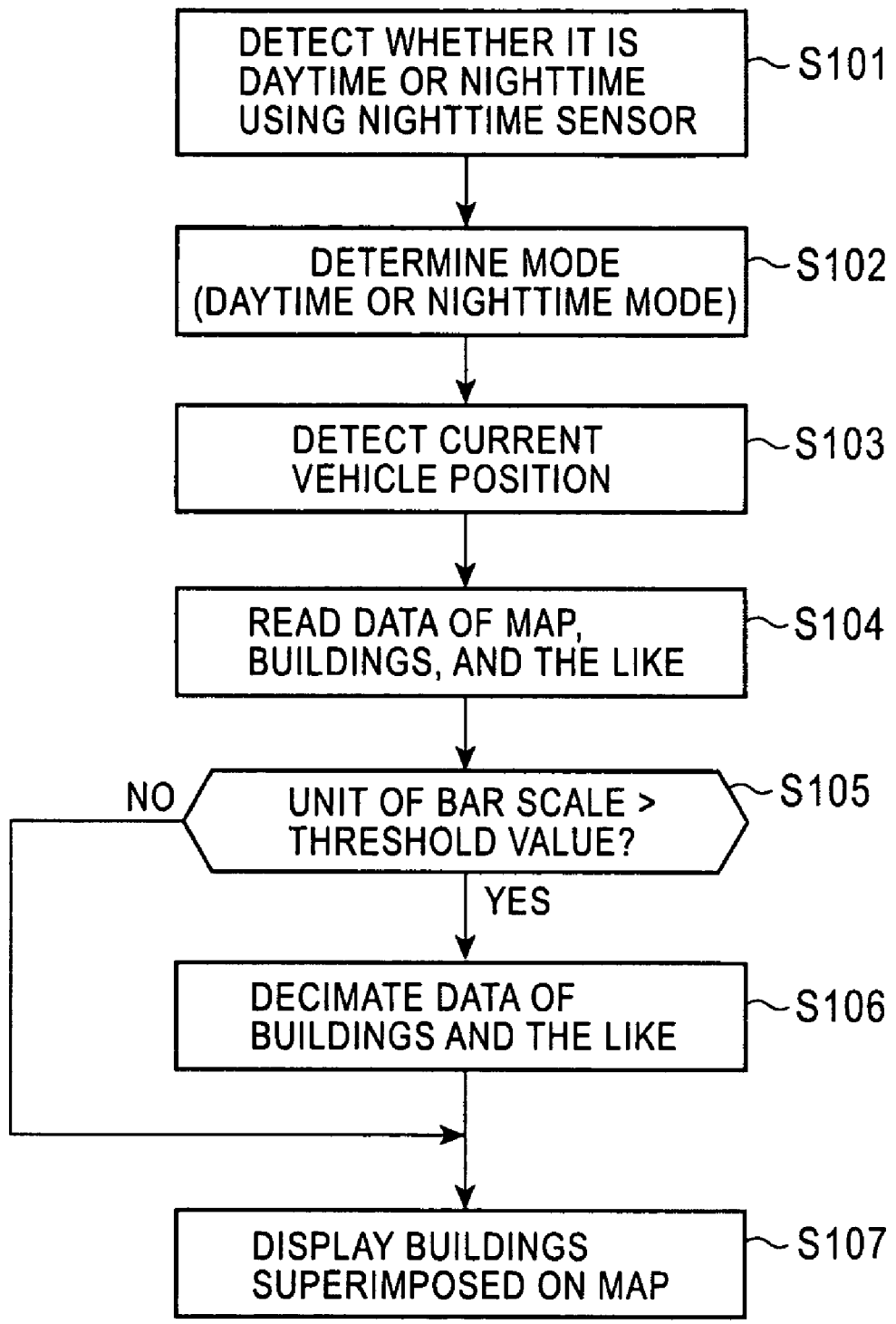
FIG. 3 is a flow chart illustrating the operation in the embodiment.

The operation of a navigation apparatus according to the embodiment, and in particular the display of buildings, will now be described with reference to the flow chart in FIG. 3. In act S101, the nighttime sensor 78 detects whether it is nighttime when the navigation apparatus is activated. In act S102, the controller 80 receives the result of the detection by the nighttime sensor 78 and determines whether it is daytime or nighttime based on this result. The result of the determination by the controller 80 is transmitted to the display controller 50. The display controller 50 operates in a daytime mode or a nighttime mode based on the result of the determination. As will be described later, in a nighttime mode, a user can feel that he or she is driving in the nighttime by adjusting the background color displayed on the display 51 to black or a dark color suitable for nighttime and by adjusting colors of roads, buildings, and the like to colors providing contrast against the background color.

In act S103, the controller 80 receives outputs from the GPS receiver 10 and/or the self-contained navigation sensor 11 to detect the current vehicle position. In act S104, data of a map and buildings around the current vehicle position is read out from the storage unit 30 based on the detected current vehicle position.

In act S105, the controller 80 determines whether the unit size of the bar scale of the map displayed on the display 51 exceeds a predetermined threshold value. In this embodiment, the threshold value can be set up in advance and is used for determining the scale. For example, when the unit size of the bar scale used in a large scale map indicates actual distance of 100 m or less, the threshold value is 100 m.

When the unit of the bar scale exceeds the threshold value, i.e., the scale is small, the controller 80 decimates building data read out from the storage unit 30 in act S106. When the scale is small, the number of buildings may increase. In this situation, when these buildings appear on a display having a predetermined resolution, the buildings are too close to each other for a user to recognize them. Accordingly, the building data to be displayed is decimated. On the other hand, when the unit of the bar scale is equal to the threshold value or less, the building data read out from the storage unit 30 is displayed, the building data not being decimated.

In act S107, the display controller 50 superimposes the building data on the map data, the building data and the map data being read out from the storage unit 30, to display the superimposed data on the display 51. The building data includes the building-shape data as shown in FIG. 2. The building-shape data is referred to for displaying polygons and the like of buildings on a map. Landmarks, a vehicle mark indicating a current vehicle position, and the like other than buildings are also superimposed on the map.

The process of decimating building data when buildings are displayed in a nighttime mode will now be described specifically. In a nighttime mode, as described above, the color of a background image is adjusted to black or a dark color corresponding to the nighttime, and roads are displayed in white or a light color so as to provide contrast against the color of the background image. Individual buildings can be displayed with yellow light spots 100. For example, in one arrangement, all pixels on a plane specified by the plane data S of building-shape data emit light, or pixels at corners of a plane specified the plane data S emit light. By adopting this arrangement, a screen as shown in FIG. 4A (a current vehicle position mark is not shown) is presented to a user so that the user feels as if he or she is viewing a night-view map.

Figure 4A:
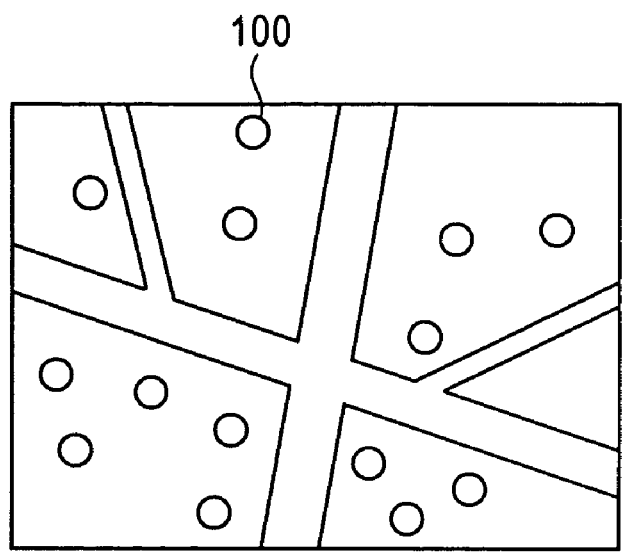
FIGS. 4A and 4B illustrate night-view maps in a nighttime mode.
Figure 4B:
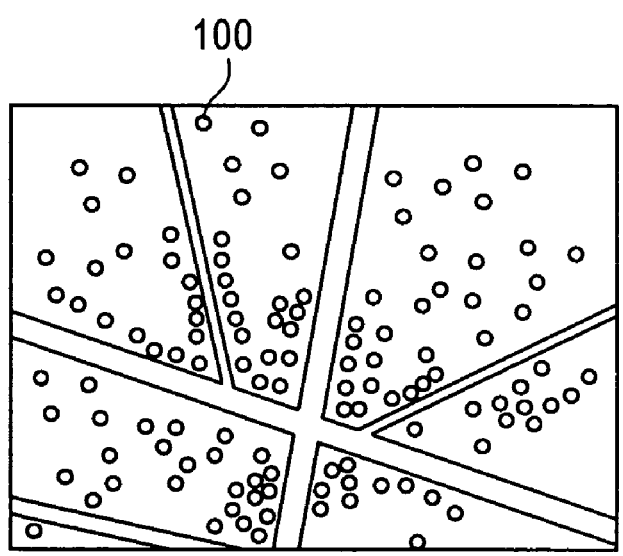

At a large scale, the number of buildings displayed on the display 51 is not large, as shown in FIG. 4A, so that a clear night-view map can be presented to a user. At a small scale, the number of light spots 100 is too large especially when an urban area including a large number of buildings is displayed. Thus, a night-view map that is hard to see, as shown in FIG. 4B, is presented to the user, so that the user is disadvantageously affected in, for example, judging roads.

Accordingly, the building data is decimated, as shown in FIGS. 5A, 5B, and 5C. As shown in Example 1 of FIG. 5A, the building data can be decimated so that all pixels on a plane specified by plane data S of building-shape data emit light at a large scale and only pixels at corners of a plane specified by plane data S emit light at a small scale. FIG. 5B illustrates typical decimation results in Example 1. Alternatively, as shown in Example 2 of FIG. 5A, the building data can be decimated so that pixels at corners of a plane specified by plane data S emit light at a large scale and pixels at the center of a plane specified by plane data S emit light at a small scale. FIG. 5C illustrates typical decimation results in Example 2. In both of the decimation processes described above, the number of light spots that emit light is decreased using building-shape data so that the display size of each building is small and the number of buildings seems to be small. Thus, a cluttered screen due to the light spots 100 can be avoided.

In the examples described above, it is preferable that the number of light spots be decreased based on the relationship between a large scale and a small scale. For example, when the unit of the bar scale used in a map having a large scale is S1 and the unit of the bar scale used in a map having a small scale is S2, the number of light spots in the map having a small scale may be reduced by a factor of exactly S2/S1 or approximately S2/S1.

Figure 6A:
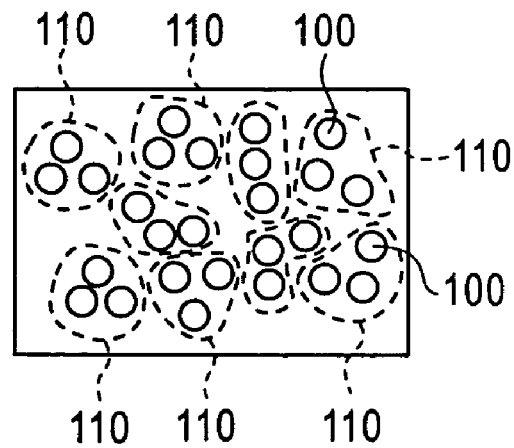
FIGS. 6A, 6B, and 6C illustrate an example of another decimation process in the embodiment.
Figure 6B:
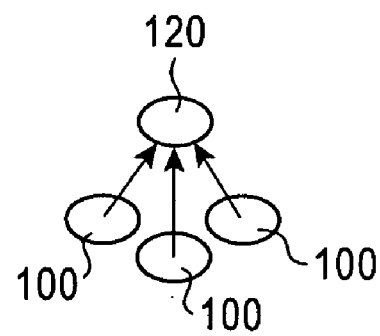
Figure 6C:
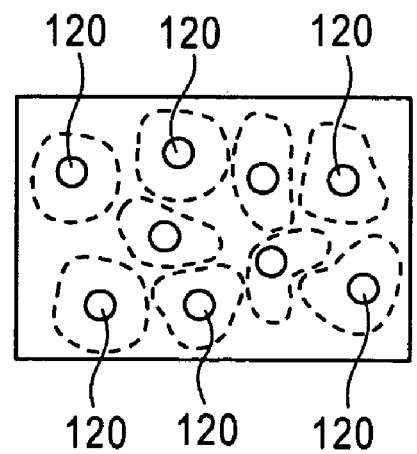

FIGS. 6A, 6B, and 6C illustrate an example of another decimation process. As shown in FIG. 6A, a plurality of light spots 100 adjacent to each other are grouped. In FIG. 6A, every three of the light spots 100 adjacent to each other are grouped into one group 110 that is indicated by a dotted line. Next, as shown in FIG. 6B, each group is assigned to one light spot 120. That is, two of three light spots in each group are decimated. For example, one light spot close to the center of each group is left. Accordingly, the number of light spots can be reduced substantially by a factor of 3.

The factor by which the number of light spots is reduced can be adjusted based on the relationship between a large scale and a small scale. For example, when the unit of the bar scale used in a map having a large scale is S1 and the unit of the bar scale used in a map having a small scale is S2, the factor by which the number of light spots in the map having a small scale is reduced can be adjusted to exactly S2/S1 or approximately S2/S1 in order to optimize the light spot density.

Each of the light spots shown in FIG. 6A may be generated from building-shape data of a building. That is, one light spot per building emits at a large scale. Thus, in FIG. 6C, the number of buildings is reduced by a factor of 3. Alternatively, the plurality of light spots shown in FIG. 6A may be generated from building-shape data of a building. In this case, the number of buildings is not reduced, but the size of each building to be displayed is reduced.

Figure 7A:
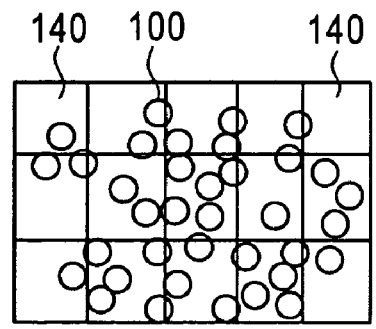
FIGS. 7A, 7B, and 7C illustrate an example of another decimation process in the embodiment.
Figure 7B:
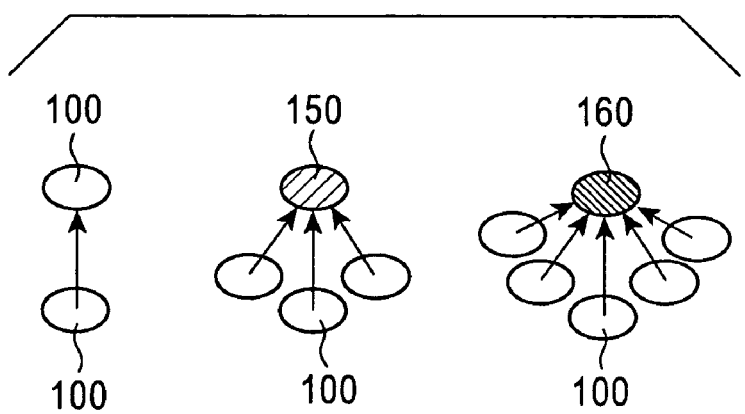
Figure 7C:
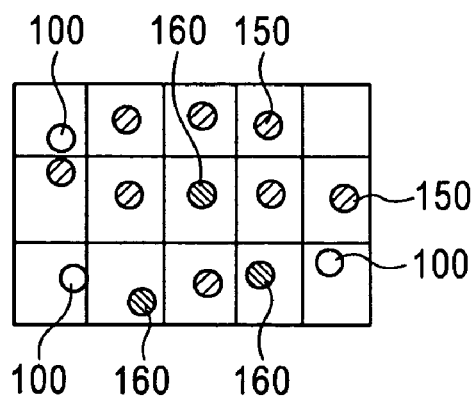

FIGS. 7A, 7B, and 7C illustrate an example of another decimation process. As shown FIG. 7A, the screen of a display is separated into a plurality of blocks 140. The number of light spots 100 in each block is counted. Then, as shown in FIG. 7B, a light spot 150 or a light spot 160 is assigned to each block and is weighted. For example, when a block includes one of the light spots 100, this light spot 100 is kept as it is, so that the light spot 100 is not weighted and is displayed in a yellow color (refer to FIG. 7C). When a block includes, for example, three of the light spots 100, a light spot 150 is assigned to the block. The light spot 150 is weighted and displayed in an orange color so as to indicate that the light spot 150 represents three of the light spots 100. Similarly, when a block includes, for example, five of the light spots 100, a light spot 160 is assigned to the block. The light spot 160 is weighted and displayed in a red color. In this way, the building density can be shown by identifying each light spot on a display by its color. When this example is seen from a different view, the light spot 150 assigned to a block means that two of the light spots 100 are decimated, as in the foregoing example. Similarly, the light spot 160 assigned to a block means that four of the light spots 100 are decimated. Each of light spots 150 and 160 can be located at, for example, the center of each block, a point in each block at which any of the light spots 100 is originally located, or any point in each block.

Figure 8A:
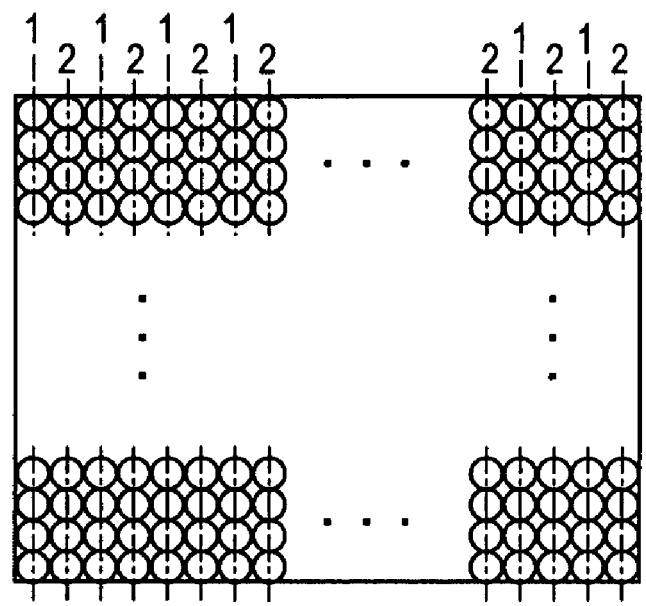
FIGS. 8A and 8B illustrate examples of other decimation processes in the embodiment.
Figure 8B:
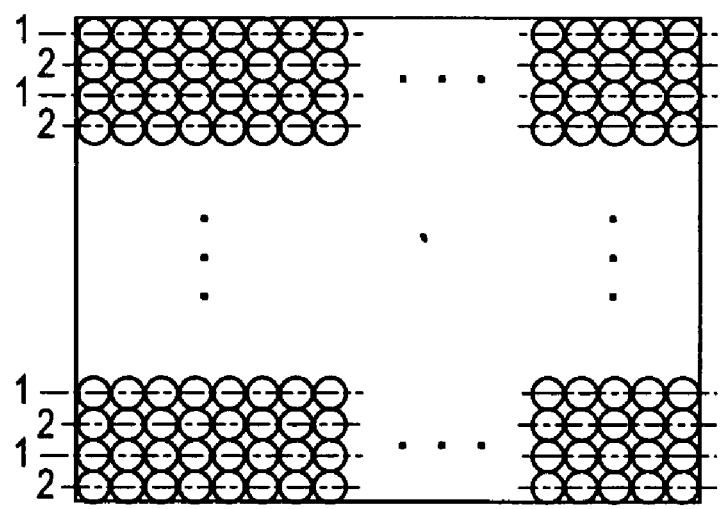

FIGS. 8A and 8B illustrate examples of other decimation processes. As shown in FIG. 8A, vertical lines of the display 51 are classified into odd lines 1 or even lines 2. In this arrangement, light spots on all odd lines 1 and even lines 2 emit light at a large scale, and only light spots on odd lines 1 or even lines 2 emit light at a small scale. Alternatively, as shown in FIG. 8B, horizontal lines of the display 51 may be classified into odd lines or even lines. In this arrangement, only light spots on odd lines or even lines emit light at a small scale.

Figures 9, 10:
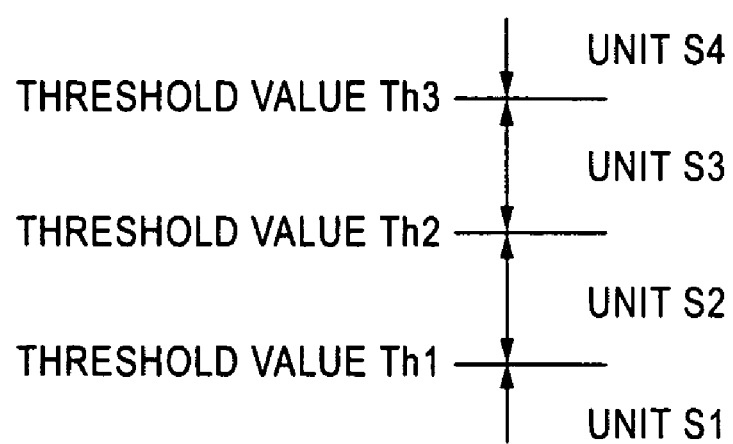
FIG. 9 illustrates an example of another decimation process in the embodiment.
FIG. 10 illustrates a second embodiment.

FIG. 9 illustrates an example of another decimation process. Unlike the examples of FIGS. 8A and 8B, a display is separated into a plurality of blocks, each block being alternately classified into blocks 1 or blocks 2. All light spots on the display emit light at a large scale, and only light spots on the blocks 1 or the blocks 2 emit light at a small scale.

A fourth embodiment according to the present invention will now be described. In previous embodiments, the unit of the bar scale of a map on a display is selected from two-level units. In this embodiment, for example, the unit of the bar scale of a map on a display is selected from multilevel units S1, S2, S3, and S4 based on multilevel threshold values Th1, Th2, and Th3, as shown in FIG. 10. Additionally, other amounts of multilevel units and threshold values may be utilized. Then, building data is decimated based on the selected unit of the bar scale.

Figures 11A, 11B:
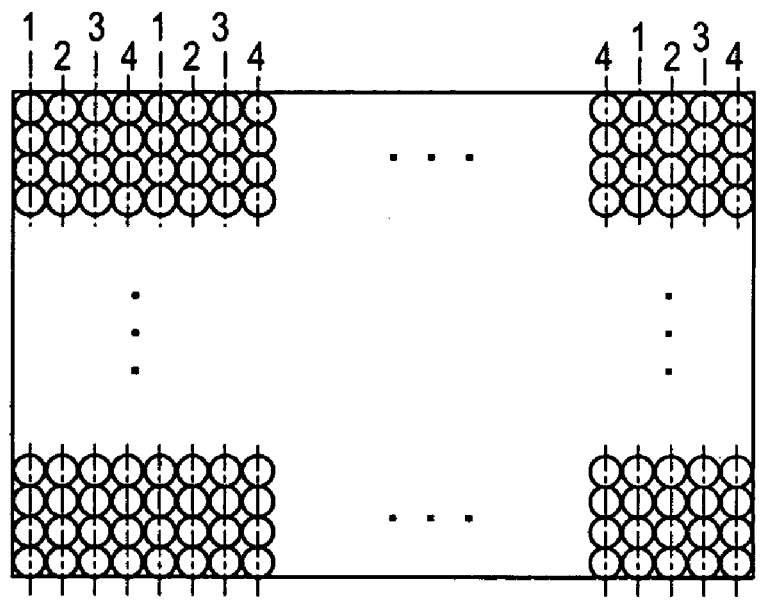
FIGS. 11A and 11B illustrate typical decimation processes in the second embodiment.

As described previously, the building data can be decimated based on a relative ratio between two of these units or the difference between two of these units. As shown in FIG. 11A, vertical lines of a display are classified into line groups 1, 2, 3, and 4. When the unit S1 is used, light spots of all buildings are displayed. That is, all of the line groups 1, 2, 3, and 4 are selected. When the unit S2 is used, three of these four line groups (for example, the line groups 1, 2, and 3) are selected and light spots on all lines of the selected line groups are displayed. When the unit S3 is used, two of these four line groups (for example, the line groups 1 and 2) are selected and light spots on all lines of the selected line groups are displayed. When the unit S4 is used, one of these four line groups (for example, the line group 1) is selected and light spots on all lines of the selected line group are displayed. Thus, the building data can be decimated and displayed based on multiple units.

Alternatively, as shown in FIG. 11B, a display may be separated into four block groups. In this arrangement, one or more block groups are selected based on an applicable unit and light spots on the selected block groups emit light, as in FIG. 9. For example, when the unit S2 is used, block groups 1, 2, and 3 are selected. When the unit S3 is used, block groups 1 and 2 are selected.

The lines and the blocks are numbered by rule in FIGS. 11A and 11B. Alternatively, these lines and blocks may be numbered at random so as to be selected at random. Thus, light spots are located at random, so that enhancement in reality of a night-view map can be expected in some cases.

In the embodiments described above, a night-view map is presented by displaying buildings with light spots in a nighttime mode. Alternatively, each building may be displayed in a two-dimensional or three-dimensional mode. For example, each building is displayed in a two-dimensional or three-dimensional mode based on building-shape data at a large scale, and is displayed with a light spot at a small scale.

In the embodiments described above, processes for displaying buildings in a nighttime mode are described. The present invention is also applicable to processes for displaying buildings in a daytime mode. In a daytime mode, a background image may include sky, water, concrete, or soil and buildings may be displayed in colors providing contrast against the background image. When the map scale changes from a large scale to a small scale, building data is decimated so that the size of each building and the number of buildings on the display are reduced.

While the preferred embodiments according to the present invention are described above in detail, the present invention is not limited to these specific embodiments. Various changes and modifications may be made within the scope of the present invention as set out in the accompanying claims.

What is claimed is:

1. An electronic device having a navigation function comprising:
   a display;
   memory configured to store building data associated with buildings to be displayed on the display, the building data including plane data having two-dimensional coordinates and further including height data;
   a judging section that judges whether a mode is a daytime mode or a nighttime mode;
   a display controlling section that controls the display such that, when the judging section judges that the mode is the daytime mode, a building is displayed on a display map based on the building data, and when the judging section judges that the mode is the nighttime mode, the display controlling section controls the display to display light spots of pixels in place of the building, wherein the light spots correspond to the plane data of the building data on the display map and have a shape that is distinct from a shape of the building; and
   a decimating section that decimates the building data based on the unit of a bar scale of a map appearing on the display,
   wherein, when the map scale is not greater than a predetermined threshold value, the decimating section causes a first number of pixels corresponding to the plane data of the building data to light up, and
   wherein, when the map scale is greater than the predetermined threshold value, the decimating section causes a second number of pixels corresponding to the plane data to light up, the second number of pixels being smaller than the first number of pixels.

2. The electronic device according to claim 1, wherein the first number is the number of all pixels included in a plane defined by the coordinates of the plane data; and the second number is the number of pixels corresponding to corners of the plane data.

3. The electronic device according to claim 1, wherein the first number is the number of pixels corresponding to corners of the plane data; and the second number is the number of pixels corresponding to the center of the plane data.

4. The electronic device according to claim 1, wherein a scale that is not greater than the threshold value is a narrow area scale; a scale that is greater than the threshold value is a wide area scale; and a ratio of the first number to the second number is determined on the basis of a ratio of the narrow area scale to the wide area scale.

5. An electronic device having a navigation function, comprising:
   memory that stores building data pertaining to a building, the building data including plane data having two-dimensional coordinates and further including height data;
   a judging section that judges whether a mode is a daytime mode or a nighttime mode;
   a display;
   a display controlling section that controls the display such that, when the judging section judges that the mode is the daytime mode, a building on a display map is displayed based on the building data, and when the judging section judges that the mode is the nighttime mode, the display controlling section controls the display to display light spots of pixels in place of the building, wherein the light spots correspond to the plane data of the building data on the display map and have a shape that is distinct from a shape of the building; and
   a decimating section that decimates the building data in accordance with a scale of a map displayed on the display,
   wherein, when the map scale is not greater than a predetermined threshold value, the decimating section causes one light spot corresponding to at least a portion of the plane data of each building data to light up, and
   wherein, when the map scale is greater than the predetermined threshold value, the decimating section groups a plurality of building data together and assigns one light spot to each group, wherein the one light spot is displayed for the plurality of building data and the decimating section causes the one light spot to light up when the building data is displayed on the display.

6. The electronic device of claim 5, wherein the plurality of building data grouped together comprises building data that is to be displayed adjacent each other on the display.

7. The electronic device according to claim 5, wherein a scale that is not greater than the threshold value is a narrow area scale; a scale that is greater than the threshold value is a wide area scale; and the number of building data grouped together is determined on the basis of a ratio of the narrow area scale to the wide area scale.

8. An electronic device having a navigation function, comprising:

memory that stores building data pertaining to a building, the building data including plane data having two-dimensional coordinates and further including height data;

a judging section that judges whether a mode is a daytime mode or a nighttime mode;

a display;

a display controlling section that controls the display such that, when the judging section judges that the mode is the daytime mode, a building is displayed on a display map based on the building data, and when the judging section judges that the mode is the nighttime mode, the display controlling section controls the display to display light spots of pixels in place of the building, wherein the light spots correspond to the plane data of the building data on the display map and have a shape that is distinct from a shape of the building; and a decimating section that decimates the building data in accordance with a scale of a map displayed on the display, wherein, when the map scale is not greater than a predetermined threshold value, the decimating section causes light spots corresponding to the plane data of the building data to light up, and wherein, when the map scale is greater than the predetermined threshold value, the decimating section divides a screen of the display into a plurality of blocks and causes one light spot to light up for each block, the one light spot for each block being weighted based of the number of light spots corresponding to the plane data of building data disposed in each of the divided blocks.

9. The electronic device according to claim 8, wherein a color of the one light spot for each block is changed based on the weighting.

10. An electronic device having a navigation function, comprising:

memory that stores building data pertaining to a building, the building data including plane data having two-dimensional coordinates and further including height data;

a judging section that judges whether a mode is a daytime mode or a nighttime mode;

a display comprising a plurality of even and odd numbered vertically and horizontally oriented lines;

a display controlling section that controls the display such that, when the judging section judges that the mode is the daytime mode, a building is displayed on a display map based on the building data, and when the judging section judges that the mode is the nighttime mode, the display controlling section controls the display to display light spots of pixels in place of the building, wherein the light spots correspond to the plane data of the building data on the display map and have a shape that is distinct from a shape of the building; and a decimating section that decimates the building data in accordance with a scale of a map displayed on the display, wherein, when the map scale is not greater than a predetermined threshold value, the decimating section causes light spots corresponding to the plane data of the building data that lie on odd-numbered lines and the building data that lie on even-numbered lines to light up, and wherein, when the map scale is greater than the predetermined threshold value, the decimating section causes light spots corresponding to the plane data of either the building data that lie on the odd-numbered lines or the building data that lie on the even-numbered lines to light up.

11. The electronic device of claim 10, wherein, lines upon which the light spots lie are either the horizontal lines on the display screen, the vertical lines on the display screen, or both the horizontal and the vertical lines on the display screen.

12. An electronic device having a navigation function, comprising:

memory that stores building data pertaining to a building, the building data including plane data having two-dimensional coordinates and further including height data;

a judging section that judges whether a mode is a daytime mode or a nighttime mode;

a display;

a display controlling section that controls the display such that, when the judging section judges that the mode is the daytime mode, a building is displayed on a display map based on the building data, and when the judging section judges that the mode is the nighttime mode, the display controlling section displays light spots of pixels in place of the building, wherein the light spots correspond to the plane data of the building data on the display map and have a shape that is distinct from a shape of the building; and a decimating section that decimates the building data in accordance with a scale of a map displayed on the display, wherein the decimating section divides a screen of the display into odd-numbered blocks and even-numbered blocks, wherein, when the map scale is not greater than a predetermined threshold value, the decimating section causes light spots corresponding to the plane data of the building data that lie in the odd-numbered blocks and the building data that lie in the even-numbered blocks to light up, and wherein, when the map scale is greater than the predetermined threshold value, the decimating section causes light spots corresponding to the plane data of either the building data that lie in the odd-numbered blocks or the building data that lie in the even-numbered blocks to light up.

* * * * *